(12) United States Patent
Piner

(10) Patent No.: US 10,458,082 B1
(45) Date of Patent: Oct. 29, 2019

(54) TRUCK SNOW-MELTING SYSTEM

(71) Applicant: James Piner, Walton, KY (US)

(72) Inventor: James Piner, Walton, KY (US)

( * ) Notice: Subject to any disclaimer, the term of this patent is extended or adjusted under 35 U.S.C. 154(b) by 213 days.

(21) Appl. No.: 15/785,565

(22) Filed: Oct. 17, 2017

Related U.S. Application Data

(63) Continuation-in-part of application No. 14/943,291, filed on Nov. 17, 2015, now abandoned.

(51) Int. Cl.
*E01H 5/10* (2006.01)

(52) U.S. Cl.
CPC ...................... *E01H 5/10* (2013.01)

(58) Field of Classification Search
CPC ..... B60B 39/00; B60B 39/028; B60B 39/026; E01H 5/10
See application file for complete search history.

(56) References Cited

U.S. PATENT DOCUMENTS

| | | | | |
|---|---|---|---|---|
| 2,325,901 | A * | 8/1943 | Atkinson | B60H 1/00295 180/271 |
| 2,515,341 | A | 7/1950 | Giguere | |
| 3,289,668 | A * | 12/1966 | Drucker | B60B 39/023 126/271.1 |
| 3,735,950 | A * | 5/1973 | Paintin | F01N 13/1822 248/62 |
| 4,063,606 | A * | 12/1977 | Makinson | B60B 39/026 180/271 |
| 4,203,423 | A * | 5/1980 | Ricci | B60B 39/023 126/271.1 |
| 4,324,307 | A | 4/1982 | Schittino | |
| 4,465,252 | A * | 8/1984 | Donovan, Jr. | F16L 3/20 248/589 |
| 4,848,510 | A * | 7/1989 | Ahmed | B60B 39/028 180/309 |
| 5,100,175 | A * | 3/1992 | Swallow | B60B 39/023 239/567 |
| 5,144,799 | A * | 9/1992 | Barth | F01N 13/04 60/313 |
| 5,722,461 | A * | 3/1998 | Lake | A47L 1/16 138/32 |
| 6,006,732 | A * | 12/1999 | Oleksiewicz | F02B 75/22 123/568.11 |
| 6,588,808 | B1 * | 7/2003 | Sheppard | B60B 39/026 291/1 |
| 6,946,621 | B1 | 9/2005 | Roseman | |

(Continued)

FOREIGN PATENT DOCUMENTS

DE      102011014890      9/2012

*Primary Examiner* — Jesse S Bogue

(57) ABSTRACT

The truck snow-melting system comprises a pair of three-port diverting valves which may, under electrical control from within the cab of a truck, be transitioned between directing exhaust gases out of the vehicle's exhaust pipe and directing exhaust gases to a left transport pipe and a right transport pipe. The left transport pipe directs exhaust gases to a left exhaust outlet located in front of driven wheels on the left side of the truck and the right transport pipe directs exhaust gases to a right exhaust outlet located in front of driven wheels on the right side of the truck. The exhaust gases melt wintery precipitation so that the truck may gain traction. A plurality of adjustment points allow the horizontal and vertical positions of the exhaust outlets to be changed.

11 Claims, 8 Drawing Sheets

(56) References Cited

U.S. PATENT DOCUMENTS

| | | | |
|---|---|---|---|
| 6,981,567 B2* | 1/2006 | Stodolka | B60K 13/04 |
| | | | 180/296 |
| 9,096,983 B1* | 8/2015 | Mejia | B05B 12/12 |
| 9,283,816 B1* | 3/2016 | Laurita | B60C 19/00 |
| 9,908,514 B1* | 3/2018 | Lopez | B60S 1/68 |
| 2009/0120070 A1* | 5/2009 | Hirata | B01D 53/944 |
| | | | 60/286 |
| 2013/0047595 A1* | 2/2013 | Khajepour | F04B 27/067 |
| | | | 60/370 |

\* cited by examiner

TRUCK SNOW-MELTING SYSTEM

CROSS REFERENCES TO RELATED APPLICATIONS

This application claims the benefit of U.S. Provisional application Ser. No. 14/943,291 filed Nov. 17, 2015.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of vehicular snow removal, more specifically, a truck snow-melting system.

SUMMARY OF INVENTION

The truck snow-melting system comprises a pair of three-port diverting valves which may, under electrical control from within the cab of a truck, be transitioned between directing exhaust gases out of the vehicle's exhaust pipe and directing exhaust gases to a left transport pipe and a right transport pipe. The left transport pipe directs exhaust gases to a left exhaust outlet located in front of driven wheels on the left side of the truck and the right transport pipe directs exhaust gases to a right exhaust outlet located in front of driven wheels on the right side of the truck. The exhaust gases melt wintery precipitation so that the truck may gain traction. A plurality of adjustment points allow the horizontal and vertical positions of the exhaust outlets to be changed.

An object of the invention is to direct exhaust gases towards driven wheels of a vehicle to melt wintery precipitation accumulated around the wheels.

Another object of the invention is to provide a 'normal operation' mode of where exhaust gases are routed through the vehicle's exhaust pipe.

A further object of the invention is to provide a 'snow melting' mode where exhaust gases are routed to exhaust outlets located in front of driven wheels of the vehicle.

Yet another object of the invention is to provide a remote control that allows the drive to switch models of operation from within the cab of the vehicle.

These together with additional objects, features and advantages of the truck snow-melting system will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck snow-melting system in detail, it is to be understood that the truck snow-melting system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck snow-melting system.

It is therefore important that the claims be regarded as including such equivalent construction insofar as they do not depart from the spirit and scope of the truck snow-melting system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
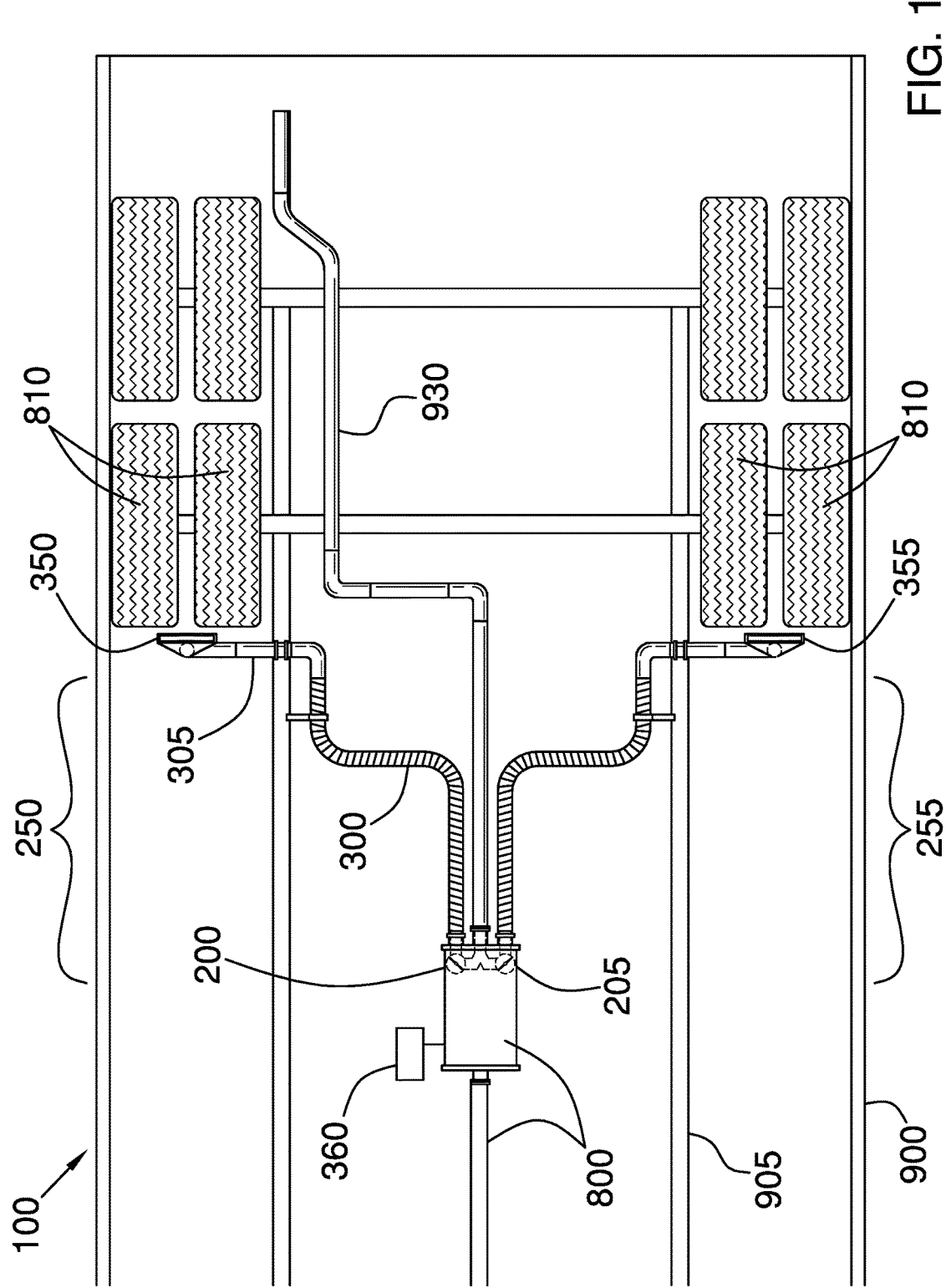
FIG. 1 is a bottom view of an embodiment of the disclosure.
Figure 2:
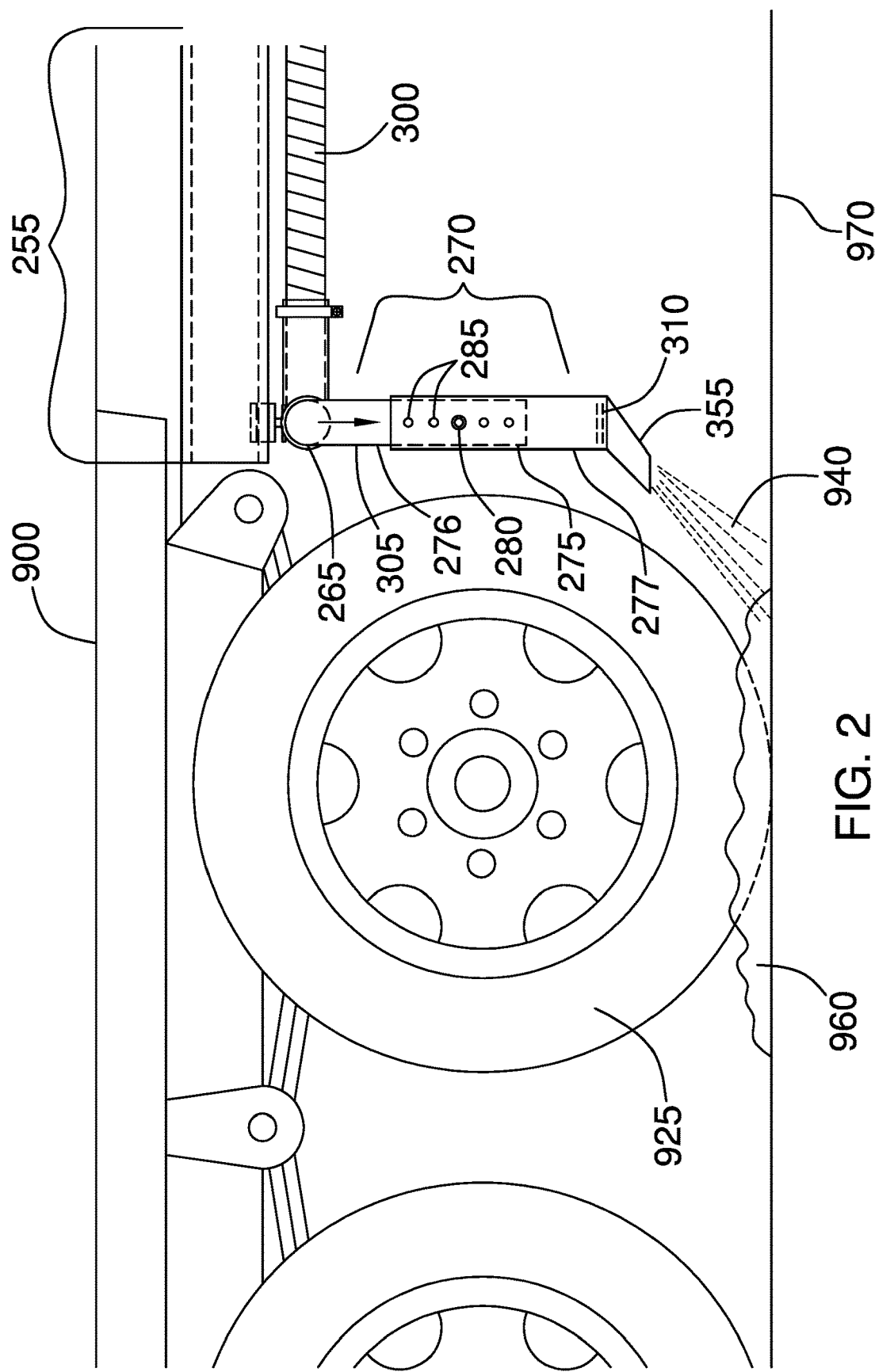
FIG. 2 is a side view of an embodiment of the disclosure.
Figure 3:
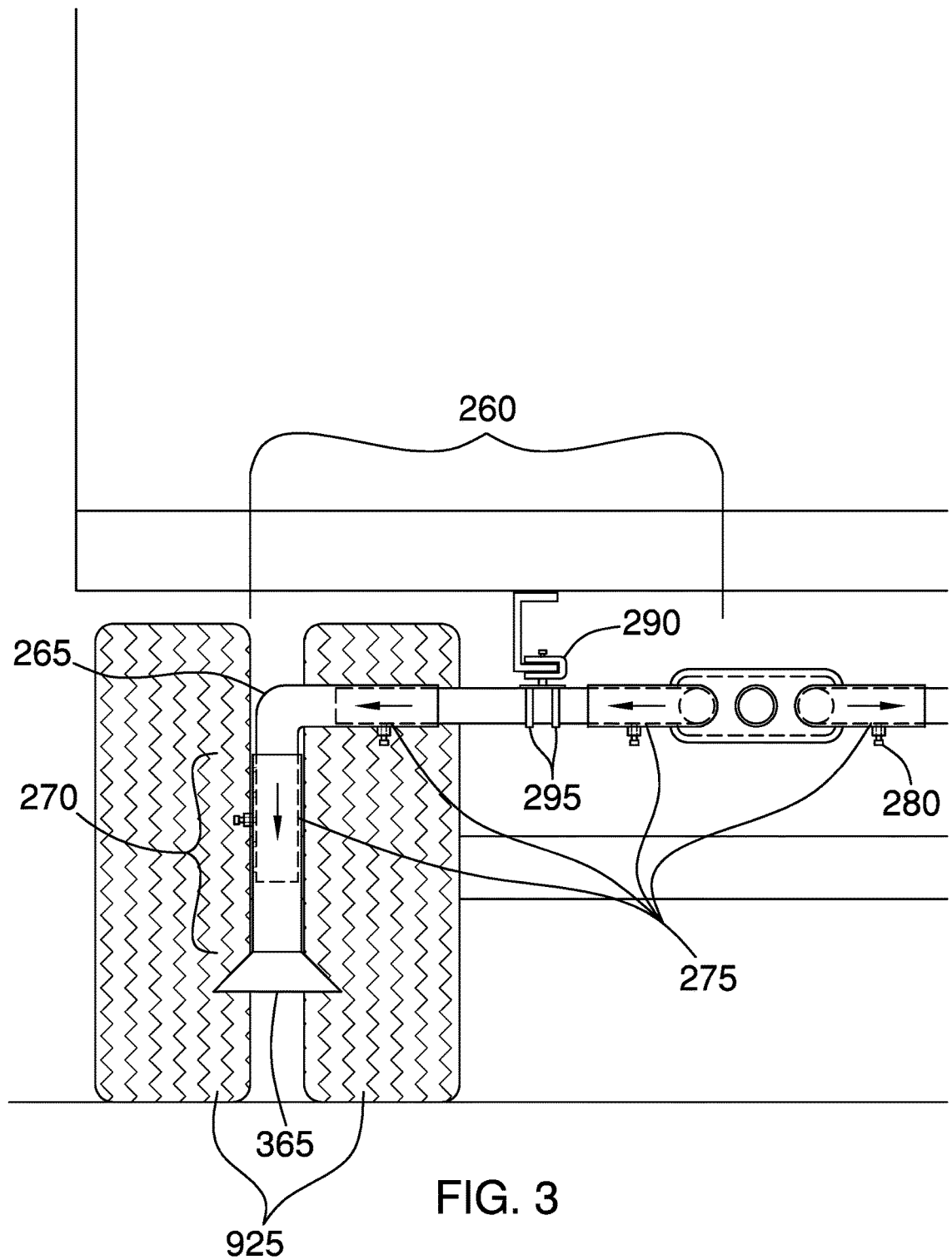
FIG. 3 is a front view of an embodiment of the disclosure.
Figure 4:
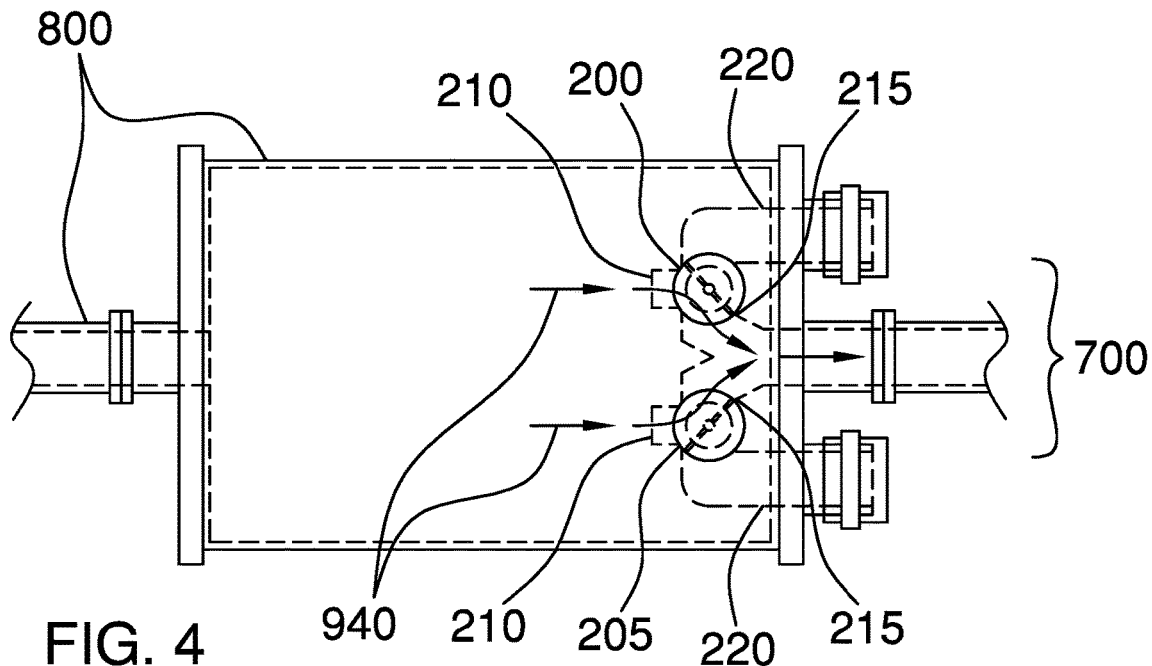
FIG. 4 is a detail view of an embodiment of the disclosure showing the diverting valves in the normal operation position.
Figure 5:
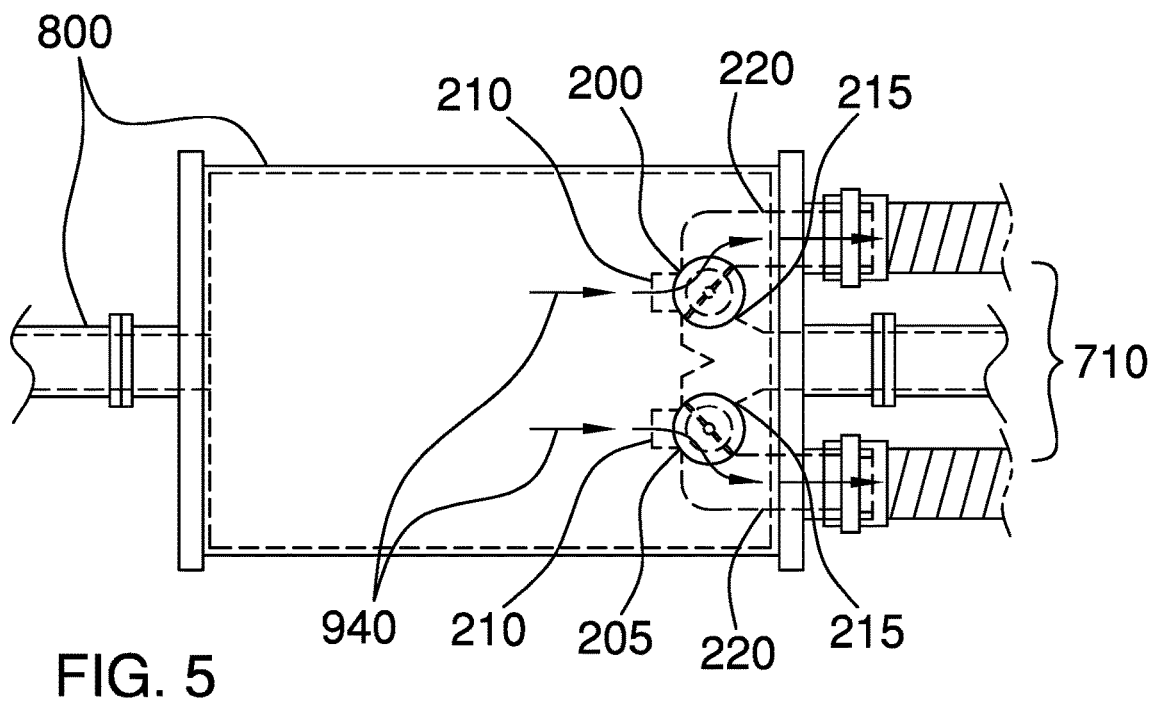
FIG. 5 is a detail view of an embodiment of the disclosure showing the diverting valves in the snow melting position.
Figure 6:
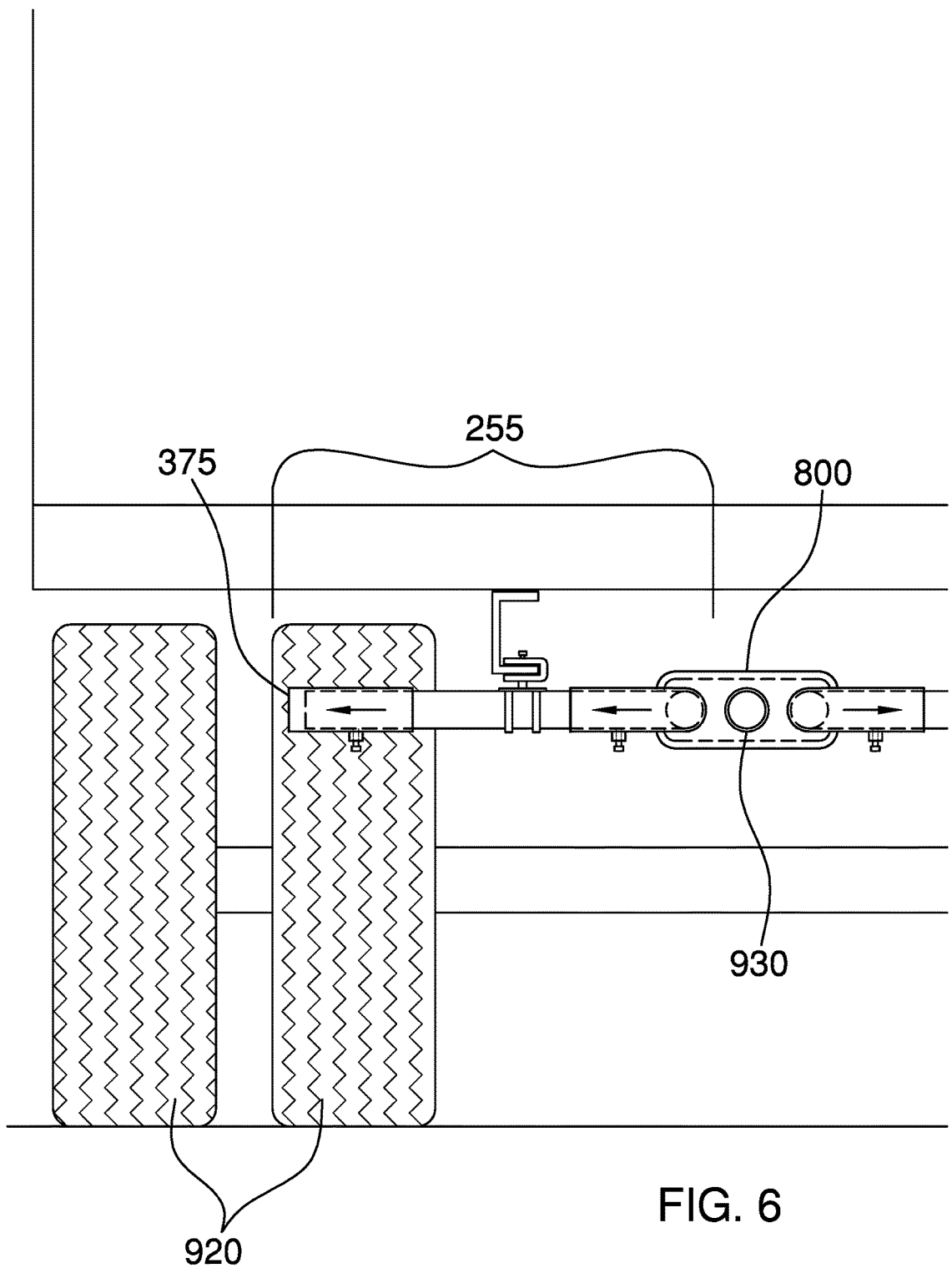
FIG. 6 is a front view of an embodiment of the disclosure showing the right side with the vertical section of the pipe removed and cap in place.
Figure 7:
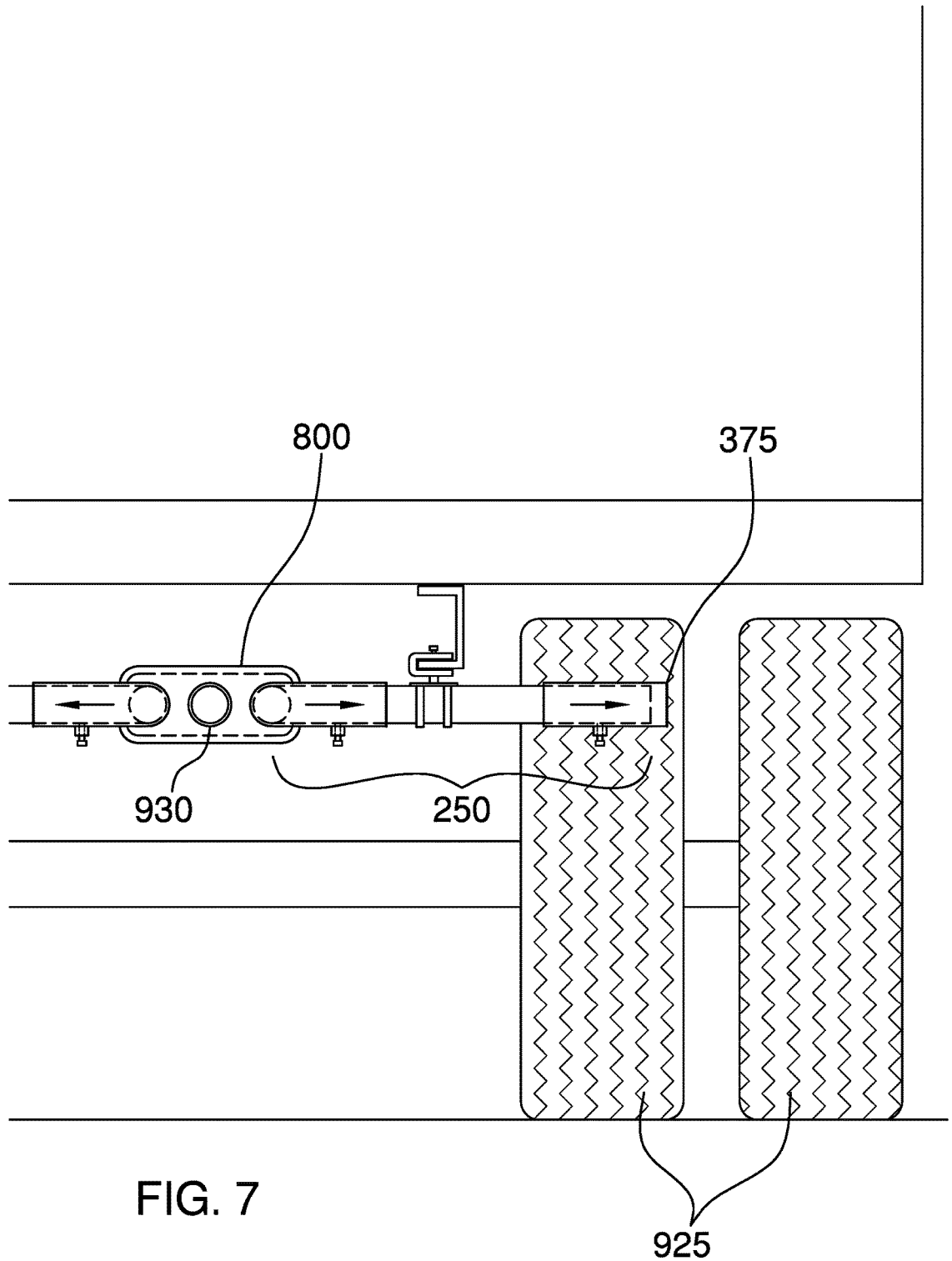
FIG. 7 is a front view of an embodiment of the disclosure showing the left side with the vertical section of the pipe removed and cap in place.
Figure 8:
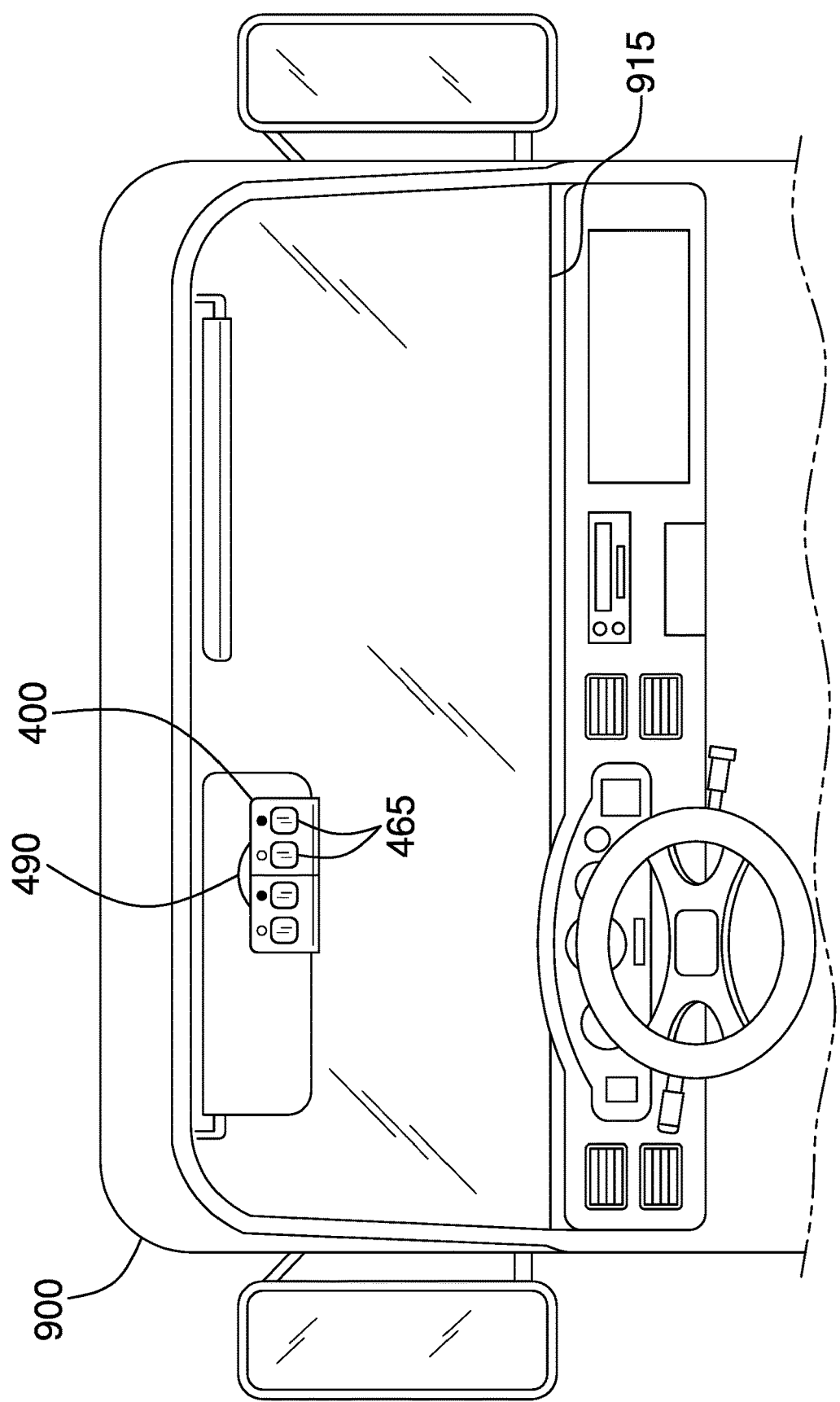
FIG. 8 is a detail view of the cab area of the truck showing placement of the remote control.
Figure 9:
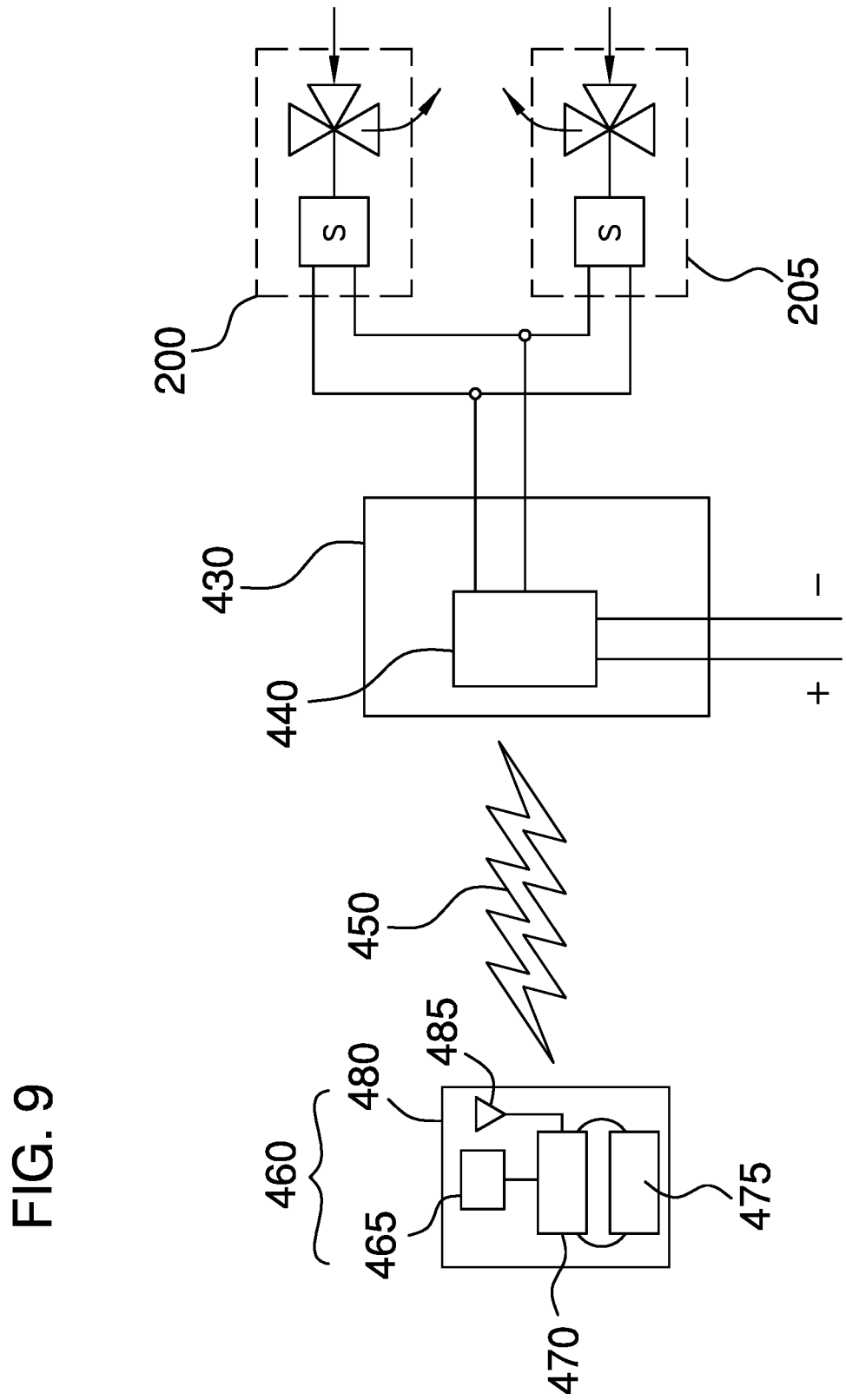
FIG. 9 is a schematic view of the control circuit and remote control.

Detailed reference will now be made to a first potential embodiment of the disclosure, which is illustrated in FIGS. 1 through 9.

The truck snow-melting system 100 (hereinafter invention) comprises a left diverting valve 200, a right diverting valve 205, a left transport pipe 250, a right transport pipe 255, a left exhaust outlet 350, a right exhaust outlet 355, a control circuit 360, and an operator control 400. The invention 100 is adapted for use with an exhaust system 800 of a truck 900. Specifically, the invention 100 diverts exhaust gases 940 from the exhaust system 800 of the truck 900 to one or more drive wheels 810 of the truck 900.

The left diverting valve 200 and the right diverting valve 205 may be commercially available three port solenoid valves. The purpose of the left diverting valve 200 and the right diverting valve 205 is to divert the flow of the exhaust gases from the exhaust system 800 of the truck 900 to the left transport pipe 250 and the right transport pipe 255, respectively, when the invention 100 is in use.

The left diverting valve 200 and the right diverting valve 205 are both coupled to the exhaust system 800 of the truck 900. Specifically, an input port 210 of the left diverting valve 200 and the input port 210 of the right diverting valve 205 may receive the exhaust gases 940 from the exhaust system 800. A first output port 215 of the left diverting valve 200 and the first output port 215 of the right diverting valve 205 may be coupled to an exhaust pipe 930 of the truck 900. A second output port 220 of the left diverting valve 200 may be coupled to the left transport pipe 250 and the second output port 220 of the right diverting valve 205 may be coupled to the right transport pipe 255.

With the left diverting valve 200 and the right diverting valve 205 in a 'normal operation' position 700, the left diverting valve 200 and the right diverting valve 205 may direct the flow of the exhaust gases 940 to the exhaust pipe 930 of the truck 900. With the left diverting valve 200 and the right diverting valve 205 in a 'snow melting' position 710, the left diverting valve 200 may divert the flow of the exhaust gases 940 from the exhaust system 800 to the left transport pipe 250 and the right diverting valve 205 may divert the flow of the exhaust gases 940 from the exhaust system 800 to the right transport pipe 255.

The left transport pipe 250 is coupled to the left exhaust outlet 350 and the right transport pipe 255 is coupled to the right exhaust outlet 355. The left transport pipe 250 may transport the exhaust gases 940 from the left diverting valve 200 to the left exhaust outlet 350. The right transport pipe 255 may transport the exhaust gases 940 from the right diverting valve 205 to the right exhaust outlet 355. One or more pipe hangers 290 in conjunction with one or more band clamps 295 may couple the left transport pipe 250 and the right transport pipe 255 to a framework of the truck 905. The one or more pipe hangers 290 may couple to the framework of the truck 905 and the one or more band clamps 295 may encircle an individual transport pipe 260 selected from the left transport pipe 250 and the right transport pipe 255. The one or more band clamps 295 may slip over a hook of the one or more pipe hangers 290 to suspend the individual transport pipe 260 from the one or more pipe hangers 290. The individual transport pipe 260 selected from the left transport pipe 250 and the right transport pipe 255 may run horizontally under the framework of the truck 905 from a muffler 910 towards the one or more drive wheels 810.

The individual transport pipe 260 may comprise a flexible portion 300 and a rigid portion 305. The rigid portion 305 of the individual transport pipe 260 may comprise an elbow 265 that changes the direction of the individual transport pipe 260 from being horizontally oriented to being vertically oriented. The rigid portion 305 is coupled to the framework of the truck 905 such that a vertical section of transport pipe 270 is positioned in front of the one or more drive wheels 810.

The flexible portion 300 of the individual transport pipe 260 may comprise a bendable pipe coupling the muffler 910 to the rigid portion 305 of the individual transport pipe 260.

Each of the individual transport pipes 260 are adjustable in both horizontal and vertical directions. Specifically, the rigid portion 305 of the individual transport pipe 260 may comprise one or more adjustment points 275 where the length of the rigid portion 305 may be changed by sliding a first pipe 276 into or out of a second pipe 277 where the first pipe 276 has a smaller outside diameter than the inside diameter of the second pipe 277. The first pipe 276 may comprise a plurality of adjustment holes 285 arranged in a straight line and the second pipe 277 may comprise a spring-loaded pin 280 which is captive to the second pipe 277. When one of the plurality of adjustment holes 285 aligns with the spring-loaded pin 280, the spring-loaded pin 280 may be pulled by a spring (not illustrated in the figures) into the hole and may thus prevent further movement of the first pipe 276 relative to the position of the second pipe 277. When it is desired to change the length of the individual transport pipe 260, the spring may be pulled out to disengage the hole and the first pipe 276 may slide relative to the position of the second pipe 277.

The vertical section of transport pipe 270 may comprise one of the one or more adjustment points 275 which may allow the height of an individual exhaust outlet 365 selected from to be adjusted.

In addition to changing the length of the individual transport pipe 260, the one or more adjustment points 275 may also be used to disconnect portions of the individual transport pipe 260. As a non-limiting example, the elbow 265 and the vertical section of transport pipe 270 may be removed during warm weather when the invention 100 will not be used. The rigid portion 305 of the individual transport pipe 260 that remains on the truck 900 may be capped using a pipe cap 375 which is a short section of pipe having the diameter of the first pipe 276, the plurality of adjustment holes 285, and a closed end. The pipe cap 375 may be inserted into the rigid portion 305 and held in place by the spring-loaded pin 280.

The bottom of the rigid portion 305 of the individual transport pipe 260 may comprise a restrictor ring 310. The restrictor ring 310 may be an annular shaped disk of metal coupled to the rigid portion 305 of the individual transport pipe 260 and oriented to reduce the diameter of the pipe. The restrictor ring 310 may increase the velocity of the exhaust gases 940 as they leave the rigid portion 305 of the individual transport pipe 260.

The left exhaust outlet 350 may be positioned and oriented such that the left exhaust outlet 350 directs the exhaust gases 940 emanating from the left exhaust outlet 350 towards the bottom of one or more left drive wheels 920 on the left side of the truck 900. The right exhaust outlet 355 may be positioned and oriented such that the right exhaust outlet 355 directs the exhaust gases 940 emanating from the right exhaust outlet 355 towards the bottom of one or more right drive wheels 925 on the right side of the truck 900. Because the temperature of the exhaust gases 940 as they leave the exhaust system 800 may be several hundred degrees, directing the exhaust gases 940 from the left exhaust outlet 350 and the right exhaust outlet 355 towards the one or more drive wheels 810 may cause wintery precipitation 960 that has accumulated around the one or more drive wheels 810 to melt, even after allowing for the fact that the exhaust gases 940 may cool and dissipate as they travel from the left exhaust outlet 350 and the right exhaust outlet 355 to the one or more drive wheels 810.

The shape of the individual exhaust outlet 365 may be suggestive of a triangle when viewed from above. At the apex of the triangle the individual exhaust outlet 365 couples to the rigid portion 305 of the individual transport pipe 260. The individual exhaust outlet 365 widens into a flare as it progresses from the apex towards the one or more drive wheels 810 so that the exhaust gases 940 emanating from the individual exhaust outlet 365 are directed to a wider area. The individual exhaust outlet 365 may also be angled with respect to the vertical section of transport pipe 270, forming a 45 degree angle +/−20 degrees with respect to vertical. The 45 degree angle allows the individual exhaust outlet 365 to be kept at a distance from both the one or more drive wheels 810 and a road 970 while still being able to direct the exhaust gases 940 towards the bottom of the one or more drive wheels 810 when the invention 100 is in use.

The control circuit 360 may be electrical circuitry that determines whether the left diverting valve 200 and the right diverting valve 205 will be placed into the 'normal operation' position 700 or the 'snow melting' position 710. At a minimum, the control circuit 360 receives a control input from the operator control 400 and electrical energy from a vehicle electrical system and applies electrical energy to the left diverting valve 200 and the right diverting valve 205 based upon the control input. The control circuit 360 may make a determination of whether or not to apply electrical energy to the left diverting valve 200 and to the right diverting valve 205, what polarity of electrical energy should be applied, and how long electrical energy should be applied.

In some embodiments, the control circuit 360 comprises an electronic circuit board 430. The electronic circuit board 430 may be coupled to the vehicle electrical system to receive electrical energy and may comprise a receiver circuit 440. Responsive to reception at the receiver circuit 440 of a wireless signal 450 sent by a remote control 460, the control circuit 360 may apply electrical energy to the left diverting valve 200 and to the right diverting valve 205, causing them to transition from the 'normal operation' position 700 and the 'snow melting' position 710, or vice versa.

As a non-limiting example, upon receiving the wireless signal 450 at the receiver circuit 440 for a first time, the electronic circuit board 430 may cause both the left diverting valve 200 and the right diverting valve 205 to transition to the 'normal operation' position 700. Upon receiving the wireless signal 450 at the receiver circuit 440 for a second time, the electronic circuit board 430 may cause both the left diverting valve 200 and the right diverting valve 205 to transition to the 'snow melting' position 710. Thereafter, each subsequent reception of the wireless signal 450 at the receiver circuit 440 may result in the electronic circuit board 430 causing the left diverting valve 200 and the right diverting valve 205 to transition back and forth between the 'normal operation' position 700 and the 'snow melting' position 710.

The operator control 400 may comprise a remote control enclosure 480, one or more control buttons 465, a transmitter circuit 470, and one or more batteries 475. Upon activation of the one or more control buttons 465, the operator control 400 may transmit the wireless signal 450 to the receiver circuit 440 located within the truck 900. The one or more batteries 475 may provide electrical energy to operate the transmitter circuit 470. The one or more batteries 475 may be rechargeable or replaceable batteries that are accessible via a removable panel (not illustrated in the figures) of the remote control enclosure 480. The operator control 400 may be positioned within a cab 915 of the truck 900 where a driver (not illustrated in the figures) may activate it to start using the invention 100. In some embodiments, the operator control 400 may comprise a visor clip 490 to enable attachment of the operator control 400 to a sun visor. In some embodiments, the transmitter circuit 470 may comprise an antenna 485 located within the remote control enclosure 480.

In use, the invention 100 is installed beneath the truck 900, the pipe caps 375 are removed by pulling the spring-loaded pin 280 holding them in place, and the vertical section of transport pipe 270 with the individual exhaust outlet 365 is installed on each side of the truck 900. The height of the left exhaust outlet 350 and the height of the right exhaust outlet 355 are adjusted using the one or more adjustment points 275 on each of the vertical section of transport pipes 270 so that the left exhaust outlet 350 and the right exhaust outlet 355 both point to the bottom of the one or more drive wheels 810. The left diverting valve 200 and the right diverting valve 205 are moved to the 'normal operation' position 700, either manually using the operator control 400 or as a default starting position determined by the control circuit 360. The truck 900 may be driven normally with all of the exhaust gases 940 being routed to the exhaust pipe 930. If the truck 900 experiences loss of traction due to the wintery precipitation 960 which has accumulated around the one or more drive wheels 810, the driver may activate the operator control 400 to transition the left diverting valve 200 and the right diverting valve 205 to the 'snow melting' position 710. The exhaust gases 940 will then be diverted to the left transport pipe 250 and the right transport pipe 255 and routed to the left exhaust outlet 350 and the right exhaust outlet 355. The hot exhaust gases emanating from the left exhaust outlet 350 and from the right exhaust outlet 355 may cause the wintery precipitation 960 to melt, thus restoring traction to the one or more drive wheels 810.

As used herein, the words "left" and "right" refer to the driver's frame of reference; the left side of the vehicle is on the driver's left side. As used herein, the words "front" and "rear" refer to a frame of reference where front is in the direction of travel and rear is the opposite of front.

Unless otherwise stated, the words "up", "down", "top", and "bottom" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object.

As used in this disclosure, a "band" is a flat loop of material.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used.

As used in this disclosure, a "clip" is a fastener that attaches to an object by gripping or clasping the object. A clip is typically spring loaded.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "disk" is a cylindrically shaped object that is flat in appearance.

As used in this disclosure, "flexible" refers to an object or material that will deform when a force is applied to it but that will not necessarily return to its original shape when the deforming force is removed.

As used in this disclosure, "horizontal" is a directional term that refers to a direction that is perpendicular to the local force of gravity. Unless specifically noted in this disclosure, the horizontal direction is always perpendicular to the vertical direction.

As used herein, a "ring" is a circular armature.

As used in this disclosure, a "solenoid" is a coil of electrical wire that generates a magnetic field and that can be used to mechanically move a shaft or armature.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "valve" is a device that is use to control the flow of a fluid (gas or liquid) through a pipe.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A truck snow-melting system comprising:
a left diverting valve, a right diverting valve, a left transport pipe, a right transport pipe, a left exhaust outlet, a right exhaust outlet, a control circuit, and an operator control;
wherein the truck snow-melting system is adapted for use with an exhaust system of a truck;
wherein specifically, the truck snow-melting system diverts exhaust gases from the exhaust system of the truck to one or more drive wheels of the truck;
wherein the left diverting valve and the right diverting valve are three port solenoid valves;
wherein the left diverting valve and the right diverting valve divert the flow of the exhaust gases from the exhaust system of the truck to the left transport pipe and the right transport pipe, respectively, when the truck snow-melting system is in use;
wherein the left diverting valve and the right diverting valve are both coupled to the exhaust system of the truck;
wherein an input port of the left diverting valve and the input port of the right diverting valve receive the exhaust gases from the exhaust system;
wherein a first output port of the left diverting valve and the first output port of the right diverting valve are coupled to an exhaust pipe of the truck;
wherein a second output port of the left diverting valve is coupled to the left transport pipe;
wherein the second output port of the right diverting valve is coupled to the right transport pipe;
wherein with the left diverting valve and the right diverting valve in a 'normal operation' position, the left diverting valve and the right diverting valve direct the flow of the exhaust gases to the exhaust pipe of the truck;
wherein with the left diverting valve in a 'snow melting' position, the left diverting valve diverts the flow of the exhaust gases from the exhaust system to the left transport pipe;
wherein with the right diverting valve in the 'snow melting' position, the right diverting valve diverts the flow of the exhaust gases from the exhaust system to the right transport pipe;
wherein the left transport pipe is coupled to the left exhaust outlet;
wherein the right transport pipe is coupled to the right exhaust outlet;
wherein the left transport pipe transports the exhaust gases from the left diverting valve to the left exhaust outlet;
wherein the right transport pipe transports the exhaust gases from the right diverting valve to the right exhaust outlet;
wherein one or more pipe hangers in conjunction with one or more band clamps couple the left transport pipe and the right transport pipe to a framework of the truck;
wherein the one or more pipe hangers couple to the framework of the truck;
wherein the one or more band clamps encircle an individual transport pipe selected from the left transport pipe and the right transport pipe;
wherein the one or more band clamps slip over a hook of the one or more pipe hangers to suspend the individual transport pipe from the one or more pipe hangers;
wherein the individual transport pipe runs horizontally under the framework of the truck from a muffler to the one or more drive wheels;

wherein the individual transport pipe comprises a flexible portion and a rigid portion;

wherein the rigid portion of the individual transport pipe comprises an elbow that changes the direction of the individual transport pipe from being horizontally oriented to being vertically oriented;

wherein the rigid portion is coupled to the framework of the truck such that a vertical section of transport pipe is positioned in front of the one or more drive wheels;

wherein the flexible portion of the individual transport pipe comprises a bendable pipe coupling the muffler to the rigid portion of the individual transport pipe;

wherein each of the individual transport pipes are adjustable in both horizontal and vertical directions;

wherein the rigid portion of the individual transport pipe comprises one or more adjustment points where the length of the rigid portion is changed by sliding a first pipe into or out of a second pipe;

wherein the first pipe has a smaller outside diameter than the inside diameter of the second pipe;

wherein the first pipe comprises a plurality of adjustment holes arranged in a straight line;

wherein the second pipe comprises a spring-loaded pin which is captive to the second pipe.

2. The truck snow-melting system according to claim 1 wherein when one of the plurality of adjustment holes aligns with the spring-loaded pin, the spring-loaded pin is pulled by a spring into the hole and prevents further movement of the first pipe relative to the position of the second pipe;

wherein when it is desired to change the length of the individual transport pipe, the spring is pulled out to disengage the hole and the first pipe slides relative to the position of the second pipe.

3. The truck snow-melting system according to claim 1 wherein the vertical section of transport pipe comprises one of the one or more adjustment points which allow the height of an individual exhaust outlet selected from to be adjusted;

wherein the one or more adjustment points are used to disconnect portions of the individual transport pipe.

4. The truck snow-melting system according to claim 1 wherein the elbow and the vertical section of transport pipe are removed during warm weather when the truck snow-melting system will not be used;

wherein the rigid portion of the individual transport pipe that remains on the truck is capped using a pipe cap;

wherein the pipe cap is inserted into the rigid portion and held in place by the spring-loaded pin.

5. The truck snow-melting system according to claim 4 wherein the bottom of the rigid portion of the individual transport pipe comprises a restrictor ring;

wherein the restrictor ring is an annular shaped disk of metal coupled to the rigid portion of the individual transport pipe and oriented to reduce the diameter of the pipe;

wherein the restrictor ring increases the velocity of the exhaust gases as they leave the rigid portion of the individual transport pipe.

6. The truck snow-melting system according to claim 5 wherein the left exhaust outlet is positioned and oriented such that the left exhaust outlet directs the exhaust gases emanating from the left exhaust outlet towards the bottom of one or more left drive wheels on the left side of the truck;

wherein the right exhaust outlet is positioned and oriented such that the right exhaust outlet directs the exhaust gases emanating from the right exhaust outlet towards the bottom of one or more right drive wheels on the right side of the truck;

wherein directing the exhaust gases from the left exhaust outlet and the right exhaust outlet towards the one or more drive wheels cause wintery precipitation that has accumulated around the one or more drive wheels to melt.

7. The truck snow-melting system according to claim 6 wherein the shape of the individual exhaust outlet is triangular when viewed from above;

wherein at the apex of the triangle the individual exhaust outlet couples to the rigid portion of the individual transport pipe;

wherein the individual exhaust outlet widens into a flare as it progresses from the apex towards the one or more drive wheels so that the exhaust gases emanating from the individual exhaust outlet are directed to a wider area;

wherein the individual exhaust outlet is angled with respect to the vertical section of transport pipe, forming a 45 degree angle +/−20 degrees with respect to vertical.

8. The truck snow-melting system according to claim 7 wherein the control circuit is electrical circuitry that determines whether the left diverting valve and the right diverting valve are placed into the 'normal operation' position or the 'snow melting' position;

wherein the control circuit receives a control input from the operator control and electrical energy from a vehicle electrical system and applies electrical energy to the left diverting valve and the right diverting valve based upon the control input;

wherein the control circuit makes a determination of whether or not to apply electrical energy to the left diverting valve and to the right diverting valve, what polarity of electrical energy should be applied, and how long electrical energy should be applied.

9. The truck snow-melting system according to claim 8 wherein the control circuit comprises an electronic circuit board;

wherein the electronic circuit board is coupled to the vehicle electrical system to receive electrical energy;

wherein the electronic circuit board comprises a receiver circuit;

wherein responsive to reception at the receiver circuit of a wireless signal sent by a remote control, the control circuit applies electrical energy to the left diverting valve and to the right diverting valve, causing them to transition from the 'normal operation' position and the 'snow melting' position, or vice versa.

10. The truck snow-melting system according to claim 9 wherein the operator control comprises a remote control enclosure, one or more control buttons, a transmitter circuit, and one or more batteries;

wherein upon activation of the one or more control buttons, the operator control transmits the wireless signal to the receiver circuit located within the truck;

wherein the one or more batteries provides electrical energy to operate the transmitter circuit;

wherein the one or more batteries are rechargeable or replaceable batteries that are accessible via a removable panel of the remote control enclosure;

wherein the operator control is adapted to be positioned within a cab of the truck where a driver activates it to start using the truck snow-melting system.

11. The truck snow-melting system according to claim 10 wherein the operator control comprises a visor clip; wherein the operator control is attached to a sun visor.

\* \* \* \* \*